US005130618A

United States Patent [19]
Pardoe

[11] Patent Number: 5,130,618

[45] Date of Patent: Jul. 14, 1992

[54] ELECTRICAL DRIVE CIRCUITS

[75] Inventor: Beverley H. Pardoe, Manchester, England

[73] Assignee: National Research Development Corporation, London, England

[21] Appl. No.: 455,915

[22] Filed: Dec. 28, 1989

Related U.S. Application Data

[63] Continuation of Ser. No. 273,351, Nov. 18, 1988, abandoned.

[30] Foreign Application Priority Data

Nov. 19, 1987 [GB] United Kingdom ................. 8727070

[51] Int. Cl.[5] ............................................ H02K 33/00

[52] U.S. Cl. .................................... 318/114; 318/130; 318/126

[58] Field of Search ............... 318/114, 119, 127, 128, 318/129, 130, 131, 132; 331/154, 155, 156, 157, 158, 116 R, 116 M

[56] References Cited

U.S. PATENT DOCUMENTS 4,479,098 10/1984 Watson ................................ 318/127
4,567,451 1/1986 Greenwood ......................... 331/155
4,811,835 3/1989 Bullivant et al. ................... 318/114
4,823,053 4/1989 McCracken et al. ............... 318/114

FOREIGN PATENT DOCUMENTS 0186393 10/1983 Japan .................................. 318/114
0743082 6/1980 U.S.S.R. ............................. 318/114

*Primary Examiner*—Steven L. Stephan
*Assistant Examiner*—Judson H. Jones
*Attorney, Agent, or Firm*—Cushman, Darby & Cushman

[57] ABSTRACT

A drive circuit including a power stage [PSH/PSV] and a control stage therefor to co-operate to supply energy in a controlled manner with regard to a reference value to an inductive load when connected in operation, means [R21, R41/R25, R42] in the power stage to produce a lower level signal indicative of the energization of the load, means [HPR/VPR] to generate a reference value for the energization signal representing a required energization, means [U3.3/U3.4] to compare the energization signal and the reference value and generate an error signal representing any difference therebetween and means [U2.1/U2.3, U2.4] to apply said error signal to said control stage to alter the energy supplied to the load towards the required condition, the reference value may also be related to the frequency at which the load is energized (SE, FBF, OSC, D4).

7 Claims, 3 Drawing Sheets

ELECTRICAL DRIVE CIRCUITS

This is a continuation of application Ser. No. 07/273,351, filed Nov. 18, 1988, which was abandoned upon the filing hereof.

This invention relates to electrical drive circuits and in particular to circuits for driving inductive loads such as coils of vibrators.

To control the movement provided by a vibrator, for example in a vibratory conveyor driven by the vibrator, the power energising the vibrator can be varied by altering the width of pulses of electrical energy supplied by the drive circuit. In general it is not economic to provide a precisely stabilised power supply for the vibrator so as variation of the mains supply voltage can alter the power energising a vibrator even when the pulse width is constant. Furthermore the starting and running of a vibrator, particularly when connected to a load, can be unreliable both because of supply variations and the effect of an excessive load. It is possible for a conveyor to "stall" with risk of damage to the electrical components of the drive and vibrator.

It is an object of the invention to provide a drive circuit to mitigate these shortcomings.

According to one aspect of the invention there is provided a drive circuit including a power stage and a control stage therefor to co-operate to supply energy in a controlled manner with regard to a reference value to an inductive load when connected in operation, means in the power stage to produce a power level signal indicative of the energisation of the load, means to generate a reference value for the energisation signal representing a required energisation, means to compare the energisation signal and the reference value and generate an error signal representing any difference therebetween and means to apply said error signal to said control stage to alter the energy supplied to the load towards the required condition.

Conveniently the means to produce the energisation signal includes a series resistor in the power stage and the energisation signal is the voltage across this resistor produced by current in the load. This arrangement compensates for variation in the voltage applied to the power stage. Conveniently the reference signal is set by a potential divider and the error signal alters the width of a pulse applied to the power stage by the control stage.

According to another aspect of the invention there is provided a drive circuit including a power stage and a control stage therefor to co-operate to supply energy in a controlled manner with regard to a reference value to an inductive load when connected in operation, including an oscillator to provide pulses at an nominal drive energisation frequency, means to generate a reference value representing oscillator pulses adequate for said connected load to be driven by the power stage, means to detect the frequency at which the connected load is actually vibrating and generate a signal indicating said actual frequency and its amplitude, means to compare the reference value and said actual signal to respond to adequate actual signal to replace the pulses generated by the oscillator with pulses generated at said vibration frequency and supplied said replacement pulses to drive the power stage.

Conveniently the means to detect vibration includes a photo transmitter/receiver sensor of the reflected-light type and a reflecting element arranged inclined to the main axis of the sensor to have the reflection of the output of the transmitter to the receiver altered on said vibration of the connected load. Conveniently the signal indicating said frequency of vibration of the connected load is filtered before said replacement pulses are generated thereby. Advantageously the oscillator can operate either above or below the frequency of operation of the connected load whereby transfer from control by the oscillator to control by the replacement pulse is not constrained to conditions when the oscillator frequency is below the frequency of operation.

Embodiments of the invention will now be described with reference to the accompanying drawings in which.

Figure 1:
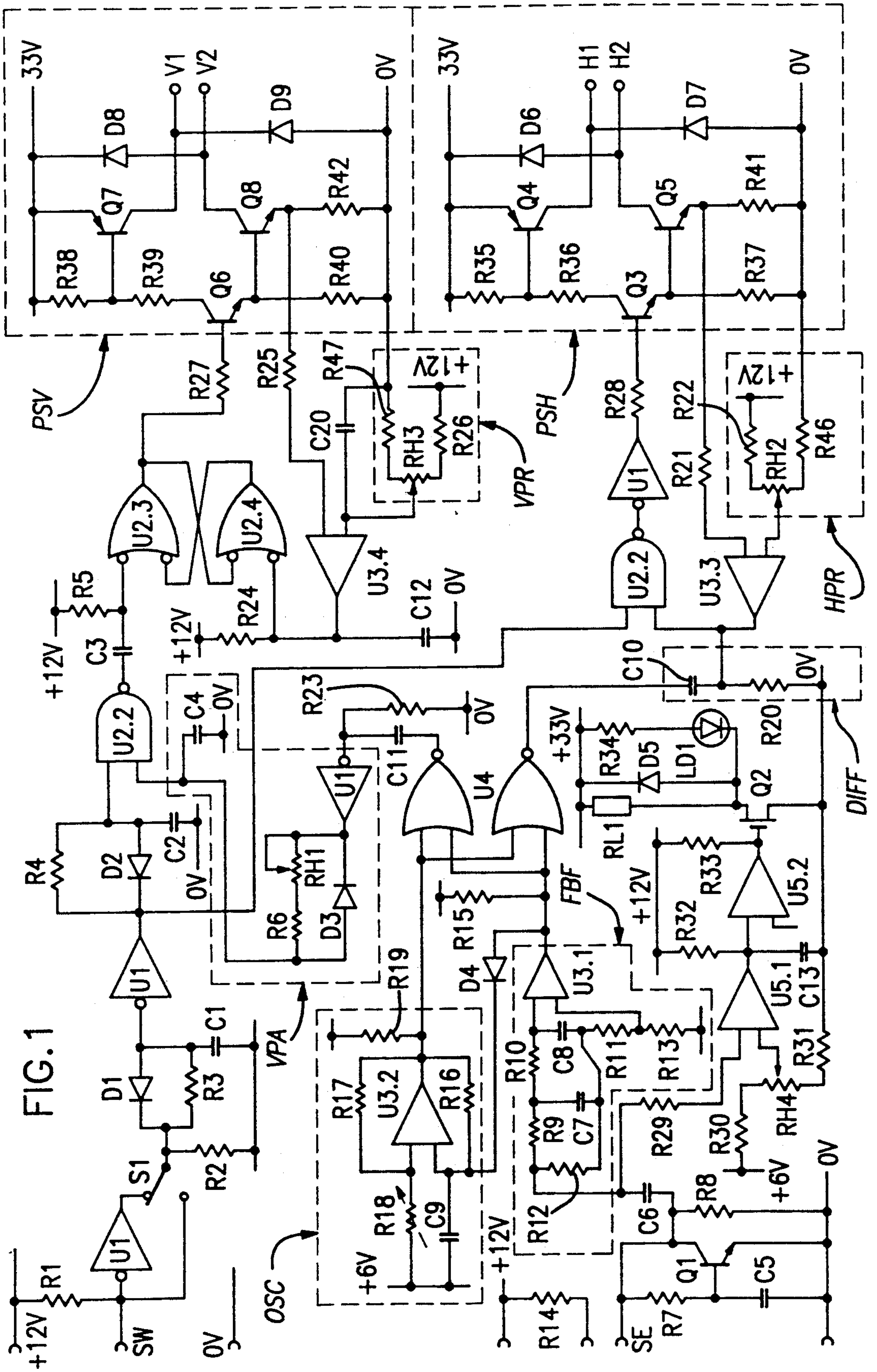
FIG. 1 shows a circuit of a drive circuit according to the invention.
Figure 2A:
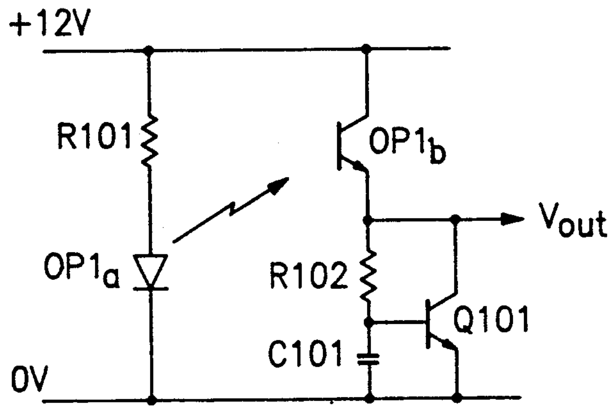
FIG. 2 shows a sensor for use with the circuit of FIG. 1.
Figure 2B:
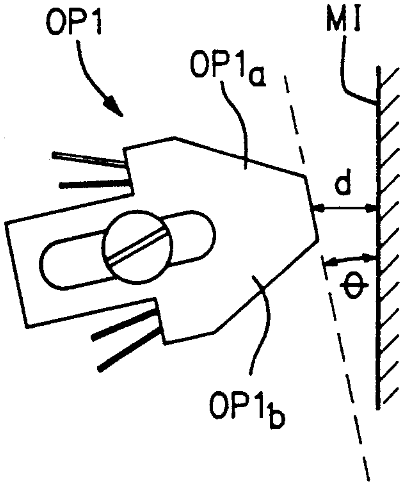

Referring first to FIG. 1 two power stages PSH ad PSV of conventional form, such as a "half-bridge", include respective energisation level signal producers in the form of resistor R41 and R42 each in the respective load current circuit. Respective comparators U3.3 and U3.4 compare the energisation level signals with respective reference values from reference sources HPR and VPR. When a comparator operates to indicate that power is excessive a respective gate U2.1 or U2.3/2.4 is operated to inhibit further supply of power by a power stage to a connected load.

In a preferred form the power stages are actuated by pulses from an oscillator OSC at a nominal frequency, which may be adjustable if required by altering R18. These pulses are passed, for power stage PSH, through a differentiator DIFF to an input gate U2.1 and for power stage PSV trough a differentiator (not referenced) a phase adjuster VPA and gate U2.2 to an input of gate U2.3/U2.4. Further overall stop/start signals are appliable to other inputs of gates U2.1 and U2.2 by a remote control connectable at input SW or by switch SW1 operated by relay RL1. The effect of gates U2.1 and U2.3/2.4 is to alter the width of a pulse applied to a respective power stage having regard to the error signals which are the outputs of comparators U3.3 and U3.4.

Figure 3:
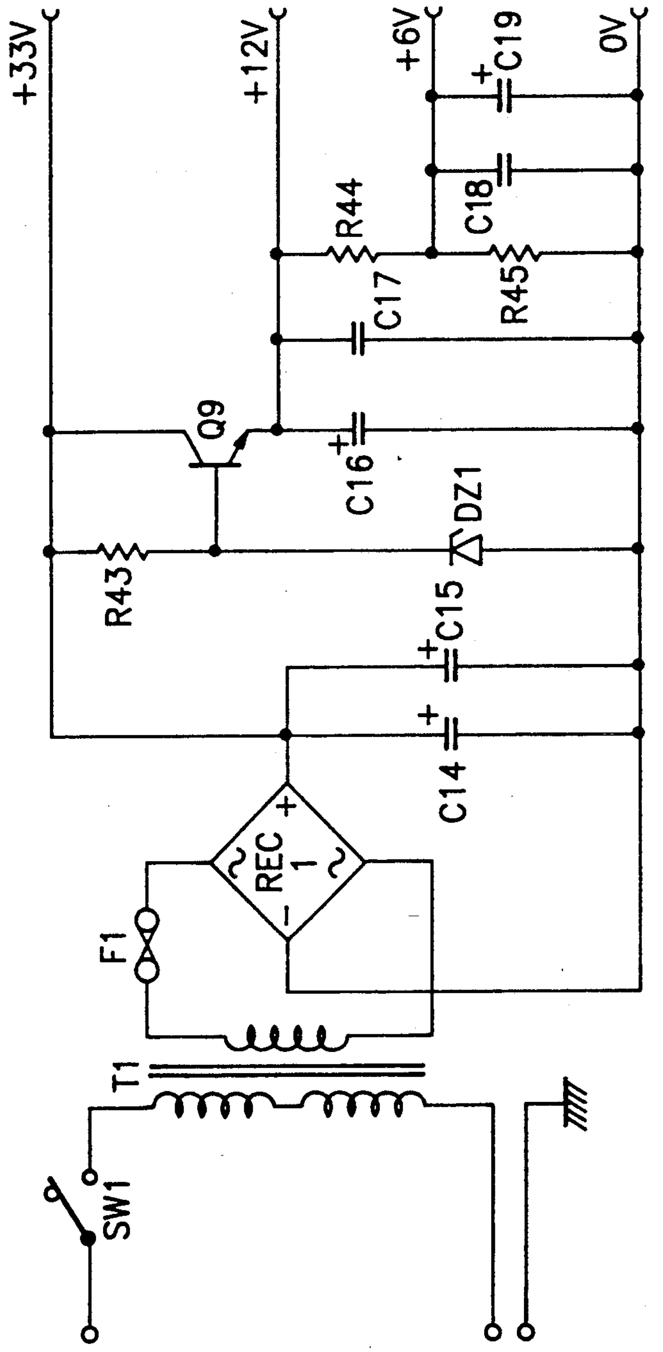
FIG. 3 shows a power supply for the circuit of FIG. 1.

By an important feature of the invention the pulses from oscillator OSC can be replaced with pulses derived from the vibration of a connected load via an attached mirror MI when, in operation, vibration is sufficient to operate a sensor, such as that reflected-light type shown in FIG. 3, connected at SE. A circuit portion around transistor Q101 responds to the output of sensor OP1 (type OP2703A for example). To overcome a d.c. component in the output of sensor OP1, which may arise from ambient light sources, a shunt path to ground for d.c. (and very low frequency a.c.) is provided via transistor Q101. The output signal from this circuit portion is filtered and amplified at FBF. When the filtered and amplified signal from FBF is sufficient diode D4 responds to inhibit oscillator OSC and the signal from FBF instead provides pulses to the power stages.

By using pulses derived from a signal fed back from the vibration of a connected load the vibration will be at the natural frequency of the connected load.

The circuit elements associated with U5.1 and 5.2 provide a level detection circuit and indicator LD1.

An advantage of this transfer arrangement is that of a "soft-start" of vibration under the control of oscillator OSC and the power regulation arrangements described above, with transfer to the natural frequency when vibration is of adequate amplitude for a feed-back signal to be usable. If the vibration is restricted, for example by excessive load, control reverts to the oscillator. The power regulation arrangement is, of course, effective in all cases. The reversion to the oscillator OSC permits the vibration to be restarted in a controlled manner, even without operator intervention if the restriction goes away.

The power supply in FIG. 3 provides "raw" d.c. at 33 v for the power stages and regulated supplies for the signal stages in known manner. If the mains supply varies the "raw" supply will vary but the drive circuit, as described above, will operate to compensate. As described only an increase in the "raw" supply is dealt with. However by choosing an operating point, set by the reference values, at the bottom of the expected range of the "raw" supply control over the hole range is available.

The electrical circuit has not been described in detail as the action of the various gates and other conventionally identified components is readily understood by those skilled in the art.

The drive circuit described provides techniques for improving the starting and running of inductive loads such as vibrator conveyors in a reliable manner at an economic cost. In particular for split-motion conveyors, such as bowl-feeders shown for example in UKPS 2030731, the horizontal and vertical actuators can be driven in a proper manner by the respective power stages PSH and PSV and the phase adjuster VPA.

I claim:

1. A drive circuit including:

a power stage and a control stage therefor to co-operate to supply energy in a controlled manner with regard to a reference value to an inductive load when connected in operation, means in the power stage to produce a power level signal indicative of the energization of the load, means to generate a reference value for the energization signal representing a required energization, means to compare the energization signal and the reference value and generate an error signal representing any difference therebetween, means to apply said error signal to said control stage to alter the energy supplied to the load towards the required condition, and a potential divider for setting said reference value, the error signal being operative to alter the width of a pulse applied to the power stage by the control stage.

2. A drive circuit according to claim 1 in which the means to produce the energisation signal includes a series resistor in the power stage and the energisation signal is the voltage across this resistor produced by current in the load.

3. A drive circuit according to claim 1 including means to compensate for variation in the voltage applied to the power stage.

4. A drive circuit according to claim 1 further including an oscillator to provide pulses at a nominal drive energisation frequency, means to generate a reference value representing oscillator pulses adequate for said connected load to be driven by the power stage, means to detect the frequency at which the connected load is actually vibrating and generate a signal including said actual frequency and its amplitude, means to compare the reference value and said actual signal to respond to adequate actual signal to replace the pulses generated by the oscillator with pulses generated at said vibration frequency and apply said replacement pulses to drive the power stage.

5. A drive circuit according to claim 4 in which the means to detect vibration includes a photo transmitter/-receiver sensor of the reflected-light type and a reflecting element arranged inclined to the main axis of the sensor to have the reflection of the output of the transmitter to the receiver altered on said vibration of the connected load.

6. A drive circuit according to claim 4 including filter means in which the signal indicating said frequency of vibration of the connected load is filtered before said replacement pulses are generated thereby.

7. A drive circuit according to claim 4 in which the oscillator can operate either above or below the frequency of operation of the connected load whereby transfer from control by the oscillator to control by the replacement pulse is not constrained to conditions when the oscillator frequency is below the frequency of vibration.

* * * * *